(12) United States Patent
McAlpine et al.

(10) Patent No.: US 9,207,712 B1
(45) Date of Patent: *Dec. 8, 2015

(54) NOTEBOOK COMPUTER WITH IMPROVED DISPLAY POSITIONING

(71) Applicant: Google Inc., Mountain View, CA (US)

(72) Inventors: Kenneth Thomas McAlpine, Los Gatos, CA (US); Martin Philip Riddiford, London (GB)

(73) Assignee: Google Inc., Mountain View, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/798,754

(22) Filed: Mar. 13, 2013

Related U.S. Application Data

(60) Provisional application No. 61/671,164, filed on Jul. 13, 2012.

(51) Int. Cl.
   *G06F 1/16* (2006.01)
   *H05K 5/00* (2006.01)
   *H05K 7/00* (2006.01)

(52) U.S. Cl.
   CPC .................................. *G06F 1/1616* (2013.01)

(58) Field of Classification Search
   None
   See application file for complete search history.

(56) References Cited

U.S. PATENT DOCUMENTS

| | | | |
|---|---|---|---|
| 5,043,846 A | 8/1991 | Kinoshita | |
| 5,085,394 A * | 2/1992 | Torii | 248/455 |
| 5,168,426 A * | 12/1992 | Hoving et al. | 361/679.09 |
| 5,200,913 A * | 4/1993 | Hawkins et al. | 361/679.09 |
| 5,267,123 A | 11/1993 | Boothroyd et al. | |
| 5,278,725 A | 1/1994 | Konno et al. | |
| 5,566,048 A | 10/1996 | Esterberg et al. | |
| 5,754,395 A | 5/1998 | Hsu et al. | |
| 5,844,543 A | 12/1998 | Tamura et al. | |
| 6,125,029 A | 9/2000 | Sasaki et al. | |
| 6,487,068 B1 | 11/2002 | Rahemtulla | |

(Continued)

FOREIGN PATENT DOCUMENTS

EP    1187261 A2    3/2002

OTHER PUBLICATIONS

"iTouchless 8-Gallon Trash Can with Infrared-Sensor Lid Opener, Stainless Steel" Walmart.com [online]. [Retrieved Jul. 30, 2013]. <http://www.walmart.com/ip/iTouchless-Stainless-Steel-Trash-Can-With-Infrared-Sensor-Lid-Opener-IT08RCB/10247557>, 2 pages.

(Continued)

*Primary Examiner* — Hoa C Nguyen
*Assistant Examiner* — Xanthia C Cunningham
(74) *Attorney, Agent, or Firm* — Lerner, David, Littenberg, Krumholz & Mentlik, LLP

(57) ABSTRACT

A portable computer that includes an upper surface, disposed between the keyboard and the back edge, a portion of which is indented with respect to adjacent portions of the upper surface. The portable computer also includes a lid assembly that has a display viewable thereon and a lower edge. The lid assembly further has a cover surface and a side surface. A hinge structure is configured to affix the lid assembly to the base assembly such that the lid is moveable between a closed position and an open position wherein the display is disposed at an angle with respect to the upper surface. In the open position at least portions of the cover surface and the side surfaces are received within the indented portion of the upper surface, and the lower edge of the screen is adjacent both the upper surface outside the indented portion and the keyboard.

19 Claims, 15 Drawing Sheets

(56) References Cited

U.S. PATENT DOCUMENTS

| | | | |
|---|---|---|---|
| 6,867,961 B2 | 3/2005 | Choi | |
| 6,870,730 B2 * | 3/2005 | Riddiford | 361/679.34 |
| 7,024,727 B1 | 4/2006 | Huang et al. | |
| 7,027,297 B1 | 4/2006 | Mizuno et al. | |
| 7,355,843 B2 | 4/2008 | Riddiford | |
| 7,583,496 B2 * | 9/2009 | Lai | 361/679.3 |
| 7,586,743 B2 * | 9/2009 | Lin | 361/679.55 |
| 7,602,606 B2 | 10/2009 | Schlesener et al. | |
| 7,616,435 B2 | 11/2009 | Wang | |
| 7,787,242 B2 | 8/2010 | Schwager et al. | |
| 7,848,094 B2 | 12/2010 | Wang et al. | |
| 7,898,815 B2 | 3/2011 | Tanaka et al. | |
| 8,032,987 B2 | 10/2011 | Oshima et al. | |
| 8,050,017 B2 | 11/2011 | Riddiford | |
| 8,200,300 B2 | 6/2012 | Wang et al. | |
| 8,248,772 B2 * | 8/2012 | Dai et al. | 361/679.02 |
| 8,248,788 B2 * | 8/2012 | Wu et al. | 361/679.55 |
| 8,248,789 B2 * | 8/2012 | Wu et al. | 361/679.56 |
| 8,250,711 B1 | 8/2012 | Chen et al. | |
| 8,254,116 B2 | 8/2012 | Wu et al. | |
| 8,369,076 B2 | 2/2013 | Chuang et al. | |
| 8,385,063 B2 * | 2/2013 | Zhu et al. | 361/679.58 |
| 8,390,997 B1 | 3/2013 | Dominy et al. | |
| 8,559,623 B2 | 10/2013 | Chen et al. | |
| 8,654,520 B2 | 2/2014 | Lin et al. | |
| 8,780,544 B2 | 7/2014 | Liang et al. | |
| 8,792,231 B2 | 7/2014 | Derryberry | |
| 8,934,231 B2 | 1/2015 | Liu et al. | |
| 2006/0077622 A1 * | 4/2006 | Keely et al. | 361/681 |
| 2006/0152893 A1 | 7/2006 | Chen | |
| 2006/0267947 A1 | 11/2006 | Nishiyama et al. | |
| 2007/0030634 A1 * | 2/2007 | Maskatia | 361/683 |
| 2007/0104467 A1 | 5/2007 | Wang et al. | |
| 2008/0174942 A1 | 7/2008 | Yang et al. | |
| 2008/0304217 A1 | 12/2008 | Lai et al. | |
| 2009/0016002 A1 | 1/2009 | Lai et al. | |
| 2011/0177850 A1 | 7/2011 | Griffin et al. | |
| 2012/0092820 A1 | 4/2012 | Hautamaki et al. | |
| 2012/0217855 A1 | 8/2012 | Chen et al. | |
| 2013/0308268 A1 | 11/2013 | Tani | |
| 2014/0125553 A1 | 5/2014 | Kim | |
| 2015/0009611 A1 | 1/2015 | Constin | |

OTHER PUBLICATIONS

Tobias Toft, "The motorised laptop" [online]. Jul. 2009. [Retrieved Jun. 24, 2013]. <http://portfolio.tobiastoft.dk/The-motorised-laptop>, 3 pages.

* cited by examiner

NOTEBOOK COMPUTER WITH IMPROVED DISPLAY POSITIONING

CROSS-REFERENCE TO RELATED APPLICATIONS

This application claims the benefit of the filing date of U.S. Provisional Application No. 61/671,164 filed Jul. 13, 2012, the disclosure of which is incorporated by reference herein.

BACKGROUND

Portable computers are often configured in a "notebook" or "clamshell" arrangement. These types of computers most often package a majority of the internal components associated with a computer into a base assembly. Such components include a printed circuit board that carries a computer's central processor, any additional peripheral processors, and at least some of the computer's memory. Additionally, the base can house one or more batteries to provide portable power for the computer, internal storage such as a hard drive or a solid state drive, mechanical connections for peripheral devices and related circuitry, the computer's input devices, and circuitry for a wired or wireless internet connection (such as via WiFi or a cellular data network). A lid assembly is typically attached to the base and includes a video display that can, for example, be in the form of LCD screen. The lid can also include circuitry related to the display and some additional components, such as various types of antennae, video cameras, or the like.

In such an arrangement, the input devices typically included in the base include a keyboard for alphanumeric input and various additional controls and a device configured to allow the user to control the position of a cursor displayed on the computer's display. This type of device can be in the form of a trackpad that includes a generally flat touch-sensitive surface that can detect the position and movement of a user's finger thereon. The trackpad structure can include one or more input buttons associated therewith or can be itself configured with button functionality. Other cursor-control devices can include trackballs and small buttons integrated with the keyboard that are sensitive to pressure in lateral directions.

In a notebook or clamshell arrangement, the lid is most often attached to the base by a hinge positioned at a back edge of the base (the edge that is positioned farthest from the user during use of the computer). Such a hinge can include elements to provide internal friction to maintain a position of the lid selected by the user to comfortably view the display, for example. The lid and the base can have the same or similar width and depth dimensions so that the lid can close against the base to protect both the screen and the input devices that are positioned on the top surface of the base. In such an arrangement, the computer can rest stably on a surface, even when the lid is positioned at an angle such that it extends reward of the base because of the greater comparative weight of the base.

Recently, touchscreens have grown in popularity as a means for providing both a display and an input for a computer. Touchscreens allow for users to interact directly with the images presented on the computer's display. Tablet computers are one of the primary devices that utilize a touchscreen and often lack other inputs such as trackpads and keyboards and are generally intended to be handheld or used while resting on a surface or in a stand to position them for easy interaction. Some desktop computers have also introduced form-factors that facilitate touchscreen interaction.

Various computer operating systems have begun to integrate touchscreen support either along with or in replacement of a typical cursor, which can in some cases remove the need for a cursor and associated cursor control input devices. In many applications, however, the use of a physical keyboard can prove useful or advantageous over representations thereof on a touchscreen. Traditional clamshell or notebook computer configurations, while providing a keyboard, may have disadvantages when combined with a touchscreen.

BRIEF SUMMARY

An aspect of the present disclosure relates to a portable computer. The portable computer includes, a lid assembly having an outer surface, an inner surface, and a display visible on the inner surface. The lid assembly further defines a lower edge. The portable computer also includes a base assembly having an upper surface, a lower surface, and a keyboard disposed on the upper surface. The base assembly further defines a front and a back and includes a pair of slots through the upper surface extending from adjacent the back toward the front. The portable computer also includes a hinge structure having first and second arms rotatably affixed to the base assembly adjacent opposite sides of the back thereof and to the lid assembly at respective locations spaced apart from the lower edge thereof. The hinge structure also has first and second rails disposed within the base assembly adjacent the slots and first and second slide elements slidably connected to the rails and further rotatably connected with the lid assembly at the lower edge thereof. The slide elements are configured to extend through the slots.

Another aspect of the present disclosure relates to a portable computer that includes a base assembly having an upper surface defining a front edge and a back edge. The base assembly further has a keyboard disposed on a portion of the upper surface. A portion of the upper surface, disposed between the keyboard and the back edge, is indented with respect to adjacent portions of the upper surface. The portable computer also includes a lid assembly that has a screen surface with a display viewable thereon and defining a lower edge. The lid assembly further has a cover surface opposite the screen surface and a side surface extending between the screen surface and the cover surface. The portable computer also includes a hinge structure configured to affix the lid assembly to the base assembly such that the lid is moveable with respect to the base between a closed position wherein the screen surface is parallel to and adjacent the upper surface and an open position wherein the screen surface is disposed at an angle of between 130 degrees and 160 degrees with respect to the upper surface. In the open position at least portions of the cover surface and the side surfaces are received within the indented portion of the upper surface, and the lower edge of the screen is adjacent the upper surface outside the indented portion is positioned within about 0.5 inches from the keyboard.

Another aspect of the present disclosure relates to a portable computer that includes a base assembly having an upper surface defining a front edge and a back edge. The base assembly further has a keyboard disposed on a portion of the upper surface. The portable computer also includes a lid assembly having a screen surface with a display viewable thereon and defining a lower edge. The lid assembly further has a housing defining a back surface opposite the screen surface, first and second side surfaces extending from the back surface toward the screen surface, and a lower surface adjacent the lower edge of the screen surface. The housing defines first and second stepped areas that are inset relative to the side surfaces and the lower surface. The portable computer further includes a hinge frame portion with first and second arms of a length and a connection member extending between the arms. The frame portion is rotatably affixed to the base assembly adjacent the back edge thereof and to the lid assembly at respective ends of the stepped areas of the housing. The hinge structure is configured such that the lid is moveable with respect to the base between a closed position and an open position. The closed position is such that the screen surface is parallel to and adjacent the upper surface and the arms of the hinge frame are disposed within the recessed portions of the housing. The open position is such that the screen surface is disposed at an angle of between 130 degrees and 160 degrees with respect to the upper surface and the lower edge of the screen surface is disposed between the front and back edges of the upper surface at a distance from the back surface at least equal to the length of the arms.

Another aspect of the present disclosure relates to a portable computer including a lid having an outer surface, an inner surface, and a display visible on the inner surface. The lid further defines a lower edge and has a magnetic bushing member attached on the lower edge. The portable computer also includes a base assembly having an upper surface defining a front edge and a back edge. The base assembly further has a keyboard disposed on a portion of the upper surface and a magnetically sympathetic element aligned with the magnetic bushing member and disposed between the keyboard and the back edge to extend at least part way therebetween. The portable computer also includes a hinge structure having first and second arms rotatably affixed to the base assembly near opposite sides of the base assembly adjacent the back edge and to the lid assembly at respective locations spaced apart from the lower edge thereof. The hinge structure is configured to permit movement of the lid between a closed position and an open position that includes rotation of the lid on the arms such that the lower edge of the lid moves relative to the base assembly in a direction between the front and back thereof. The magnetic bushing member of the lid assembly and the magnetically sympathetic element are mutually attracted with one another to releaseably maintain the lower edge of the lid adjacent the upper surface of the base during such movement.

Another aspect of the present disclosure relates to a portable computer that includes a base assembly having an upper surface, a lower surface, and a keyboard disposed on the upper surface. The base defines a front and a back. The portable computer also includes a lid assembly having an outer surface, an inner surface, and a display visible on the inner surface. The lid defines a lower edge that is affixed to the base such that it is rotatable with respect to the base and slidable along the upper surface thereof along a distance between the back of the base and the keyboard. The portable computer also includes a hinge structure having first and second arms rotatably affixed to the base assembly near opposite sides of the back thereof and to the lid assembly at respective locations spaced apart from the lower edge thereof. A frame member defines respective first and second arm covers and a connecting member extending between the arm covers. The frame member is removably affixed to the arms at the second arm portions such that that the arm covers overlie the arms and extend outwardly therefrom. The frame member is configured to release from the arms upon a force above a predetermined threshold applied between the arm covers and the upper surface of the base.

Another aspect of the present disclosure relates to a button arrangement for use in a computer keyboard that includes a plurality of alphanumeric keys distributed in an array having four rows, each of the alphanumeric keys being of a uniform width and height with respect to the array. The button arrangement includes a first button and a second button. The first and second buttons are configured as computer keys and together occupy a space equal in width and height to those of the alphanumeric keys. The first and second buttons are located on the keyboard adjacent to at least one of the alphanumeric keys in the corresponding row thereof, and are configured to provide distinct inputs to the computer.

Another aspect of the present invention relates to a portable computer that includes a base assembly having an upper surface defining a front edge and a back edge. The base assembly further has a keyboard disposed on a portion of the upper surface with a plurality of alphanumeric keys in an array including four rows of keys. The array further has a top row of keys configured for numeric input to the computer. The portable computer further includes a lid assembly including a screen surface having a display viewable thereon and defining a lower edge. The portable computer further includes a hinge structure configured to affix the lid assembly to the base assembly such that the lid is moveable with respect to the base between a closed position wherein the screen surface is parallel to and adjacent the upper surface and an open position wherein the screen surface is disposed at an angle of between 130 degrees and 160 degrees with respect to the upper surface and the lower edge of the screen is positioned within about 0.5 inches of the top row of keys.

Another aspect of the present disclosure relates to a portable computer that includes a base assembly having an upper surface with a keyboard disposed on a portion thereof. The portable computer further includes a lid assembly affixed to the base and rotatable between a closed position and an open position. The lid assembly has a screen surface with a display viewable thereon and a cover assembly opposite the display. The cover has a first frame portion and an insert, the first frame portion defining an open end and extending along at least portions of three sides of the insert, and the insert being affixed to the first frame portion and removable therefrom by sliding the insert in the direction of the open end. The portable computer further has a second frame portion having first and second arms of a length and a connection member extending between the arms. The second frame portion being removably affixable to the lid assembly so as to enclose the open end of the first frame portion and configured to obstruct sliding of the insert in the direction of the open end at least when the lid is in the closed position.

Another aspect of the present invention relates to a portable computer including a lid defining a display surface with a display visible thereon and an outer surface opposite the display surface. The portable computer further includes a base defining a front and a back and having an upper surface and a lower surface extending between the front and the back. The lid is rotatably affixed to the base such that the lid is moveable between a closed position in which the display surface is parallel to and adjacent the upper surface and an open position in which the display surface is angled with respect to the upper surface by at least 90 degrees. The lower surface of the base includes a ridge disposed between an area of a first thickness and an area of a second thickness that is less than the first thickness. The area of the first thickness is disposed between the back and the ridge, and the ridge is positioned at a distance away from the back of between 0.5 inches and 2 inches. The base further includes a high-friction element overlying at least a portion of the ridge.

DETAILED DESCRIPTION

Figure 1:
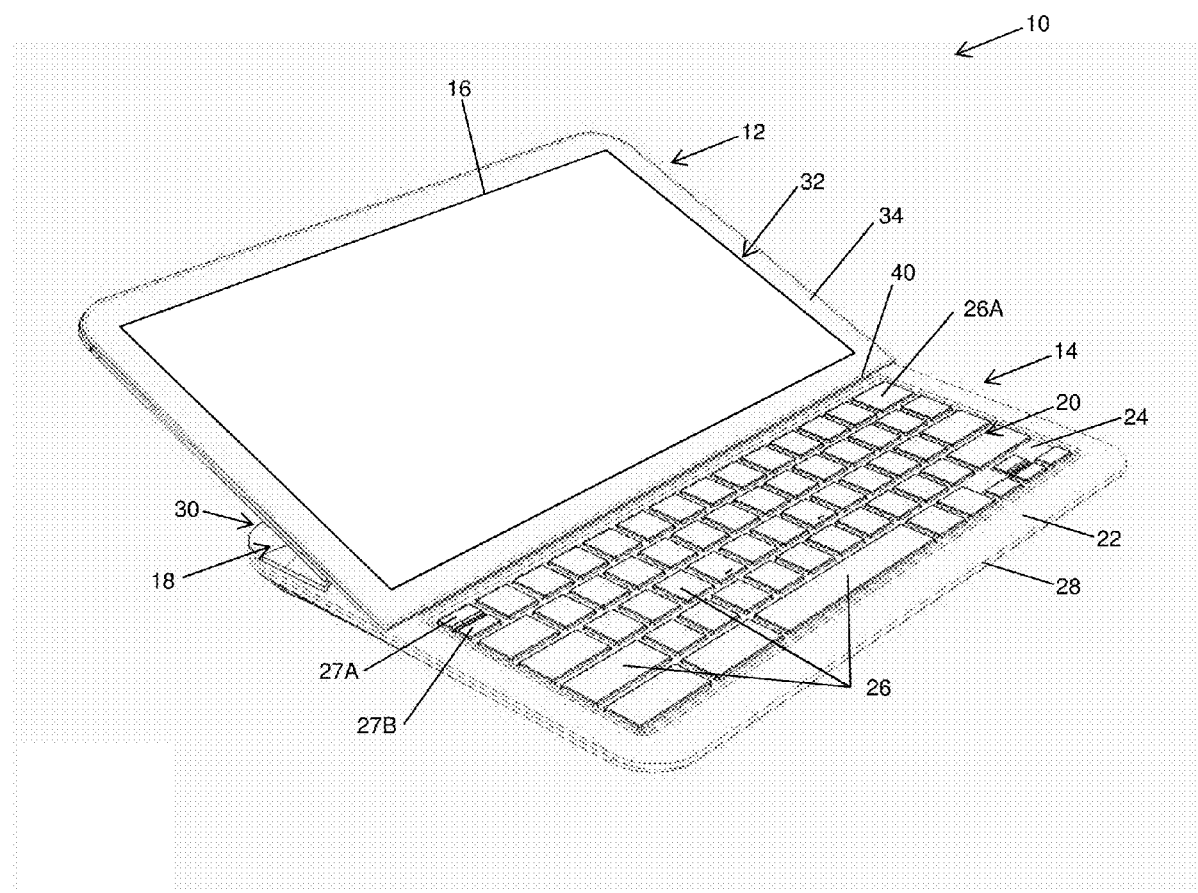
FIG. 1 shows an isometric view of a portable computer according to an embodiment of the present disclosure in an open configuration.
Figure 2:
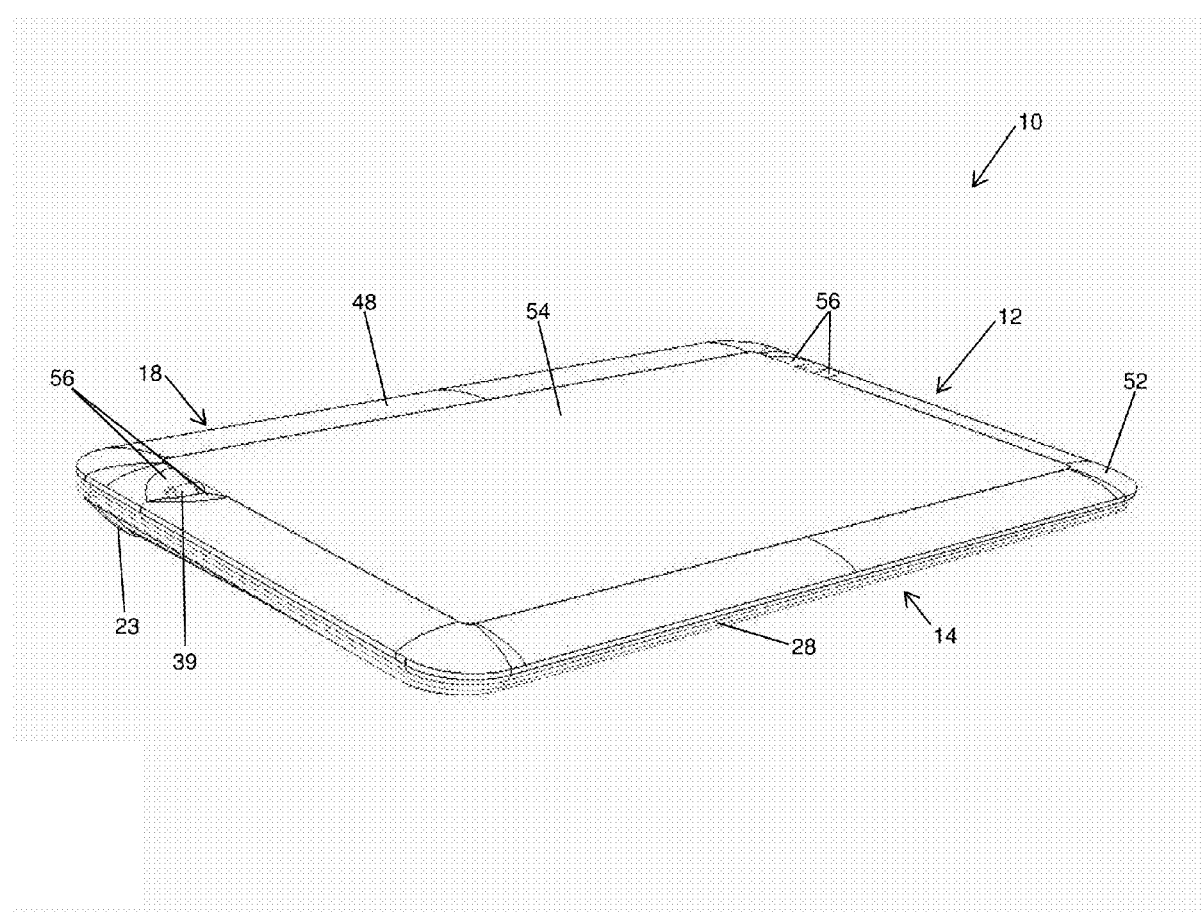
FIG. 2 shows an isometric view of the portable computer of FIG. 1 in a closed configuration.

Turning to the drawing figures, FIG. 1 shows a portable computer 10 in a form that is similar in some respects to a "notebook" or "clamshell" computer with a base 14 configured to rest on a surface and to support a lid 12 including a screen 16. Lid 12 is connected to base 14 by a hinge structure 18 that allows the lid 12 to close against the base 14, as shown in FIG. 2, and to be opened by rotation away therefrom into a user-selectable viewing position during use of computer 10.

Base 14 includes a keyboard 20 positioned on an upper surface 22 of base 14 such that it is accessible for use as an input device by a user when computer 10 is in an open position, as shown in FIG. 1. In an embodiment, keyboard 20 can be positioned in a recess 24 within upper surface 22 so that the individual keys 26 of the keyboard 20 are positioned flush with or below upper surface 22 so that lid 12 can close against surface 22 without interfering with keys 26. Further, keyboard 20 can be positioned toward a front edge 28 of base 14. In an example, keyboard 20 can be positioned closer to front edge 28 than an opposing back edge 30 of base 14. This relative position can be measured from either the portion of keyboard 20 nearest front edge 28 compared to that of back edge 30 or at a center of the keyboard 20. In an example, keyboard 20 can be positioned such that the portion thereof closest to front edge 28 is within about 2 inches of front edge (e.g., +/−5%). In another example, keyboard 20 can be positioned such that the portion thereof closest to front edge 28 is within ¾ inches of front edge 28. Further, keyboard 20 can be in a position that includes a position that is, in other clamshell notebook configurations, occupied by another input device, such as a trackpad, trackball or the like.

As stated above, lid 12 includes a screen 16 disposed at an inside surface 32 of lid 12 that can include a bezel area 34 that surrounds and frames screen 16. Bezel area 34 can be of a thickness necessary to retain the internal components associated with screen 16 or to give a desired strength to lid 12 overall. Surface 32 can be defined on a clear substrate of a material, such as glass or the like, and screen 16 can be an area of such a substrate that overlies a display such as an LCD panel or the like. In such an example, the substrate, and accordingly the surface 32 can extend outwardly over at least a portion of bezel 34. In other examples, surface 32 can be partially defined on a substrate that overlies a display, the remaining portion of surface 32 that is defined by another piece of material that surrounds the display. The overall size of lid 12 can be dictated at least in part by the size of the screen 16. The screen dimension can be measured by a combination of the ratio of screen width to height and a diagonal dimension of the screen 16. In an example, screen 16 can be in a widescreen format with a 16:9 width-to-height ratio. Further, screen can have a diagonal dimension of, for example, about 11 inches, about 13", about 15", or other intermediate, greater, or lesser dimensions. The overall dimensions of lid 12 can reflect the overall ratio and diagonal size of screen 16, with an allowance for the desired bezel size and additional room for other features such as the attachment to base 14 or other design features.

The dimensions of upper surface 22 of base can be configured to generally match that of inside surface 32 of lid 12. Thus, the width and depth of base 14 overall can be dictated in part by the dimensions of screen 16. Such a configuration can allow for screen 16 to be protected by base 14 when the computer 10 is in the closed configuration shown in FIG. 2. This configuration can also be such that a majority of the internal components of the computer 10 can be positioned within base 14. This, combined with the overall dimensions of base 14 can provide an arrangement that can stably support lid 12 through a range of viewable positions.

In an example, computer 10 can be configured with transparent touch-sensitive circuitry positioned between the display and the substrate associated with screen 16. Such circuitry can be of any type that is capable of receiving touch input from a user such as by a capacitive structure, surface acoustic wave, or a resistive structure. By including such circuitry, screen 16 can be configured as a touchscreen that detects the location of a touch, or multiple touches by a user. The computer 10 can be configured to read the touch information collected by the screen 16 to detect taps, touches, or gestures of the user using, for example a finger or multiple fingers. The computer 10 can be further configured to interpret these interactions with the screen 16, allowing the user to control various functions of the computer 10 using screen 16. In a further example, computer 10 can be configured without a trackpad or other secondary input, allowing the user to interact with screen 16 and keyboard 22 only during use thereof.

In an embodiment of computer 10 that includes both touchscreen 16 and keyboard 22 input, it can facilitate use that includes a user switching from keyboard input to screen input to position screen 16 at an angle that is between about 120 degrees and 160 degrees, and in one example about 155 degrees (+/−5%) from upper surface 22 of base 14. This can be compared to other clamshell notebook computer configurations, which include a trackpad or other input device, a keyboard and a screen that is not configured as a touch input (or may accept touch input but is not intended as a primary input). In such configurations, the screen can be comfortably used in a range of between about 90 degrees and 110 degrees from the top surface of the corresponding base.

Thus, the overall footprint, that is the width and depth occupied by the overall notebook, including the area occupied by the base along a surface, plus the distance past the base that the lid extends over such a surface, is not substantially greater than the base itself. However, if such a notebook were opened to an angle of between 125 degrees and 150 degrees, for example, such a footprint would be nearly twice the depth of the notebook in the closed configuration. Examples of the present hinge structure 18 can provide a computer in which the lid 12 can be positioned at an angle of between, for example, 130° and 160° relative to surface 22, while the footprint of the computer is 160% of the computer in the closed configuration or less. In some examples, the footprint of the computer with lid 12 in the fully opened position (shown for example in FIG. 4 can be 140% of the depth of the footprint of the computer in the closed configuration. In other words, edge 44 of lid 12 can be positioned behind the back edge 30 of base 14 when lid 12 is angled at between 130° and 160° with respect to surface 22 at a distance that is less than 60%, and in some examples less than 40%, of the depth of base 14.

Accordingly, the hinge structure 18 in computer 10 is configured such that bottom edge 40 of surface 32 is translated away from back edge 30 and toward keyboard 20 when lid 12 is moved from the closed position to an open position by translational motion that is constrained to the rotational motion of lid 12. It is noted that the open position of such a computer 10 can include any range in which screen 16 is comfortably visible by a user. Additionally, computer 10 can be opened to an angle that is more appropriately suited for touch interaction with screen 16, such as between 125 and 150 degrees, while occupying a footprint that is smaller than that of a back-hinged configuration that provides only rotation of a lid. Such a footprint can be more convenient when using computer 10 on a crowded or small work surface, or one that is shared with other users. Further, the constrained translational movement of screen 16 that is associated with the rotation of lid 12 between various positions allows screen 16 to be positioned at distance that is farther away from the user when the screen 16 is more upright and closer to a user when it is angled backward. This can allow for comfortable use during periods of heavy keyboard interaction, such as during typing (when the screen may be comfortably positioned more upright), or during periods of heavy touchscreen interaction or combined keyboard and touchscreen interaction. During such usage, the screen can be angled to more closely match the angle of the upper surface 22 of the base 14, which brings screen 16 closer to the user without the user having to reposition the computer 10 and without interference from base 14.

Figure 3:
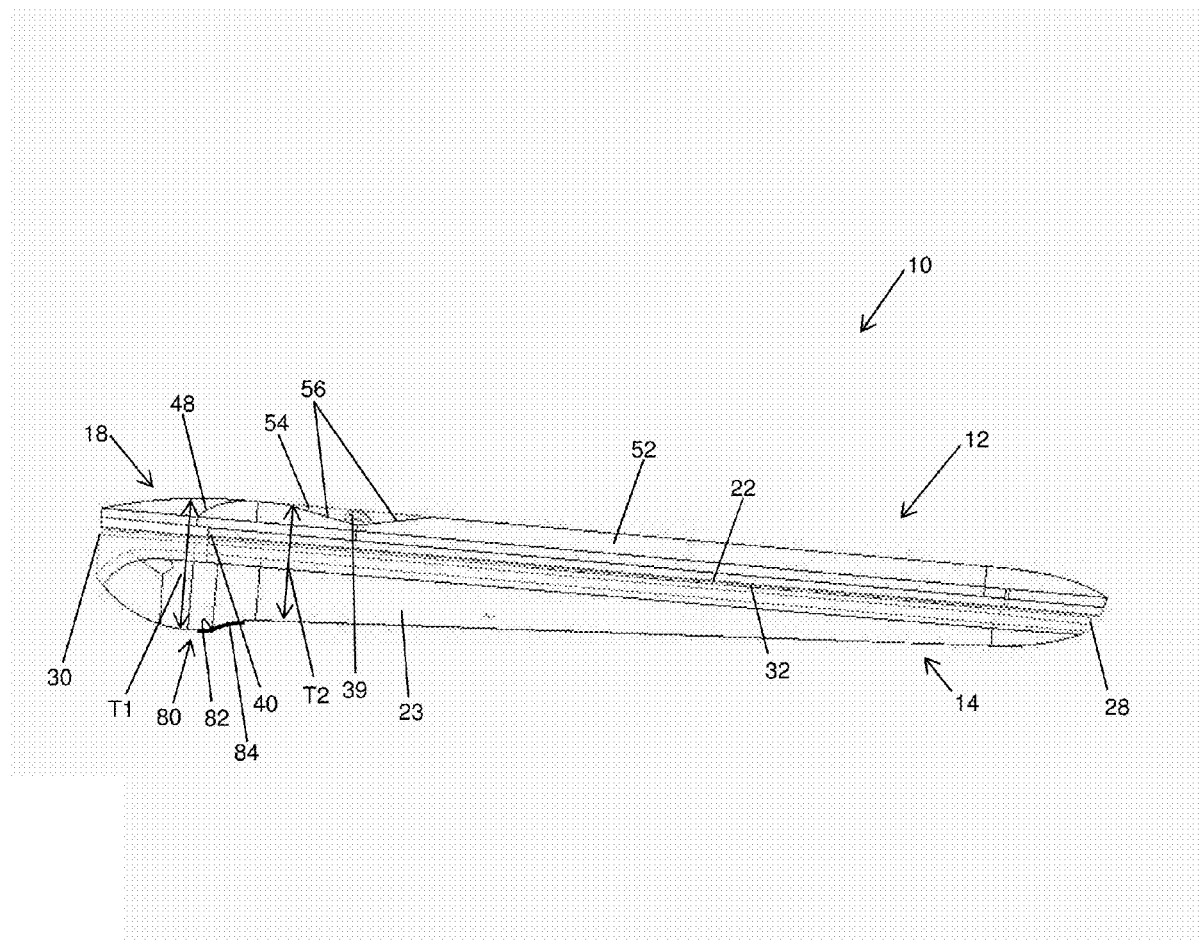
FIG. 3 shows a side elevational view of the portable computer of FIG. 1 in the closed configuration.
Figure 4:
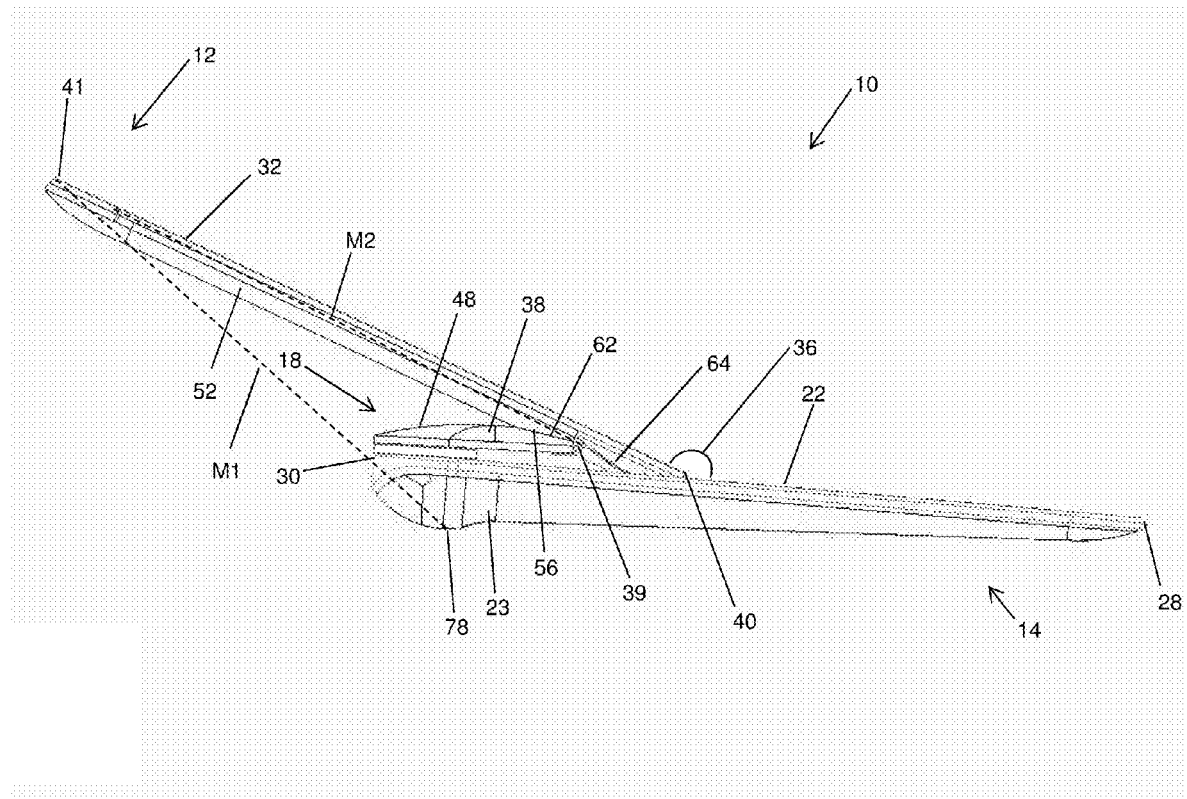
FIG. 4 shows a side elevational view of the portable computer of FIG. 1 in the open configuration.
Figure 5:
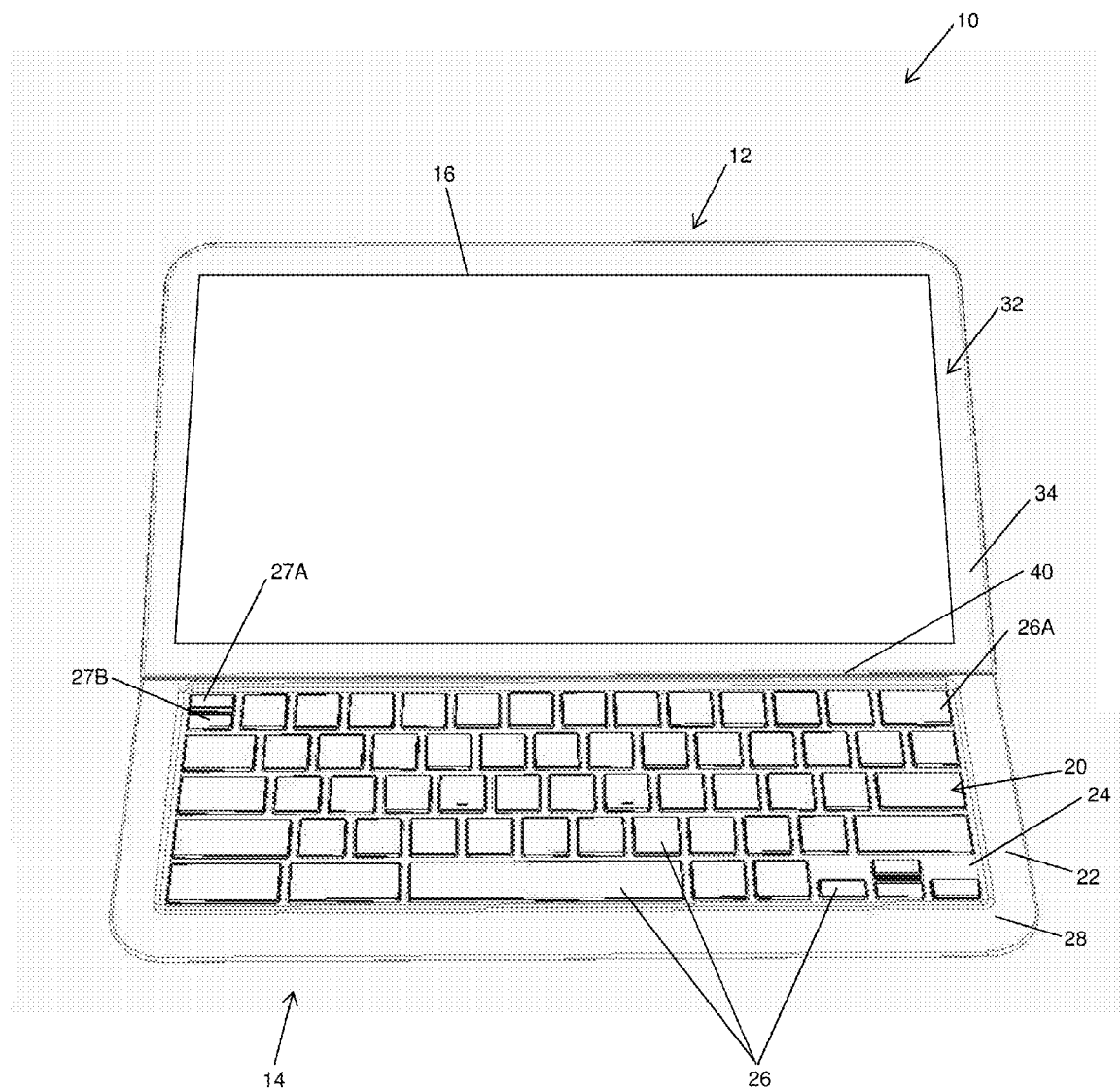
FIG. 5 shows a front view of the portable computer of FIG. 1 in the open configuration.

As shown in FIGS. 3-4, the hinge structure 18 includes a pair of arms 38, each positioned on a respective side of lid 12 and attached thereto by hinges 39. Arms 38 are pivotally connected to base 14 near back edge 30 thereof and are also pivotally connected to lid 12 at a position remote from the bottom edge 40 of surface 32 at a distance 42 (shown in FIG. 6). Thusly, lid 12 is indirectly connected to base 14 by arms 38. Lid 12 can then be connected to base 14 directly near the bottom edge 40 of surface 32 thereof by a sliding connection that allows bottom edge 40 to translate away from back edge 30 of base 14 as lid 12 is rotated to an open position. Similarly, as lid 12 is rotated toward the closed position, bottom edge 40 can slide toward back edge 30 of base 14. Such a configuration allows for computer 10 to implement aspects of a typical clamshell form-factor, particularly with respect to the relative sizes of base 14 and lid 12, which allows for protection of screen 16 by base 14 when in the closed position. Further, this arrangement allows for the base 14 to house the majority of the computer's internal components to provide desired weight distribution for computer 10. The hinge system 18 also allows for computer 10 to deviate from a typical clamshell form-factor in various open positions thereof. As described above, this allows the lid 12 to be positioned relative to the base 14 with screen 16 at an angle 36 relative to upper surface 22 that is conducive to touch interaction with screen 16, including combined interaction between screen 16 and keyboard 20, while positioning screen 16 at a comfortable distance from user and while providing a reduced footprint compared to that which could be provided by a clamshell configuration at a comparable screen angle.

The distance of the sliding connection, as well as the length of arms 38 can depend on the overall size of the computer 10, which, as described above, can be largely dictated by the size of the screen 16 used in a particular configuration of computer 10. In an example, the distance that the sliding connection travels can be on the order of the depth of the area of upper surface 22 of base 14 that is disposed to behind the keyboard 22. Such an arrangement can allow screen 16 to lie flat against surface 22 in the closed position with the bottom edge 40 of lid 12 generally aligned with back edge 30 of base 14. This arrangement can further allow for the bottom edge 40 of surface 32 to be positioned as close as possible to keyboard 20 at least when lid 12 is in the most open position provided by the hinge structure 18. The length of arms 38 can, in such an example, be configured to provide the desired maximum angle 36 between screen 16 and upper surface 22, as can the location of attachment 39 between arm and lid 12. In many examples, a longer arm 38 length can result in a lower maximum angle 36 and a shorter arm 38 length can result in a greater maximum angle 36. In an embodiment, arms 38 can have a length that results in a maximum angle 36 of rotation for screen 16 relative to upper surface 22 of between about 150 degrees and about 160 degrees (+/−5%), for example about 155 degrees, although other values of angle 36 are possible.

Figure 6:
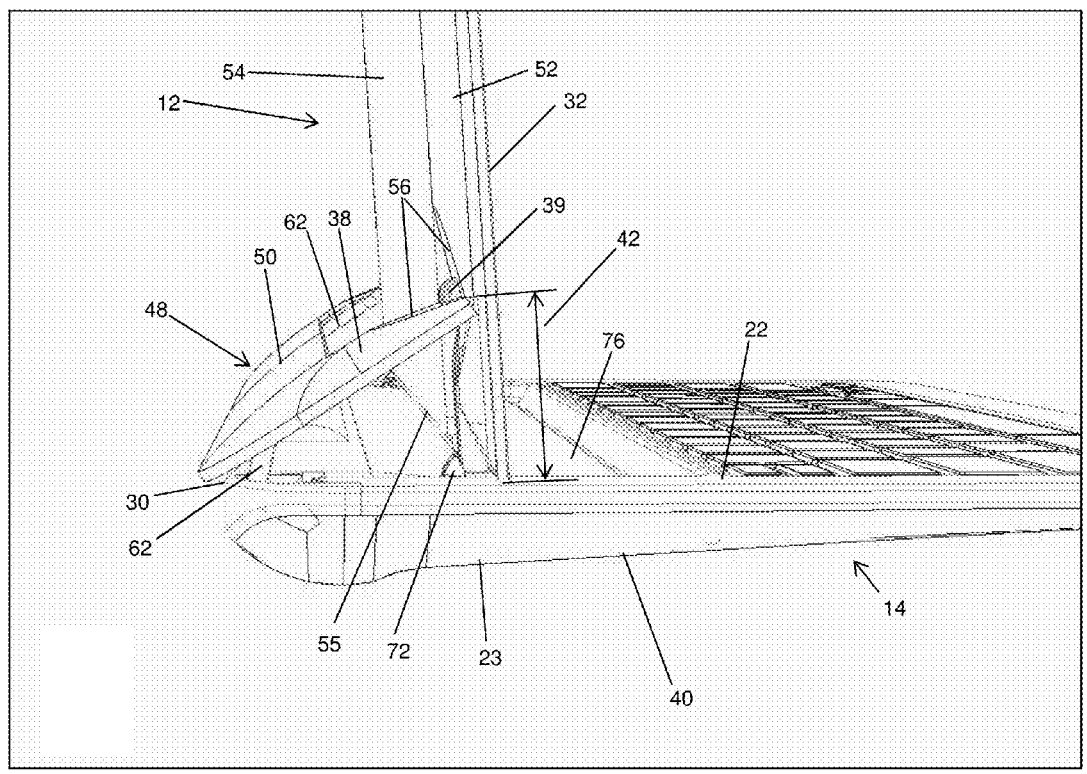
FIG. 6 is a detail view of a hinge structure included in the portable computer of FIG. 1.

As shown in FIG. 6, the hinge structure can include a frame element 48 that can have at least portions of arms 38 integrally formed therewith. In such a structure, arms 38 can be linked by a central member 50 that can increase the overall strength of hinge structure 18 and which links the movement of arms 38. As shown in FIG. 2, frame element 48 and lid 12 can be arranged to interact to give a substantially uniform appearance when computer 10 is in the closed configuration. In an example of such a structure, lid 12 can include a lid frame 52 that partially surrounds an insert 54. Lid frame 52 can extend around insert 54 and can terminate at a point along each of the sides where lid frame 52 meets arms 38 of frame element 48 at hinge 39. The arms 38 can align with lid frame 54 such that frame element 48 surrounds the remaining portion of insert 54 when computer 10 is closed. When computer 10 is opened, insert 54 rotates with the rest of lid 12 and moves away from frame element 48, as shown in FIGS. 2 and 6. Corresponding angled faces 56 in the arms 38 as well as in lid frame 52 can be configured to allow rotation of the lid 12 relative to arms 38 during opening of computer 10 and can further provide a stop at the maximum desired rotation for lid 12 relative to base 14.

As mentioned above, screen 16 can be surrounded by a bezel 34 that can extend outwardly and over a portion of lid frame 52 on the side of screen 16. Bezel 34 can continue beyond lid frame 52 such that it is positionable between frame element 48 and upper surface 22 when computer 10 is closed, but moves away from lid frame 52 with the remainder of lid 12 when computer 10 is opened.

Figure 7:
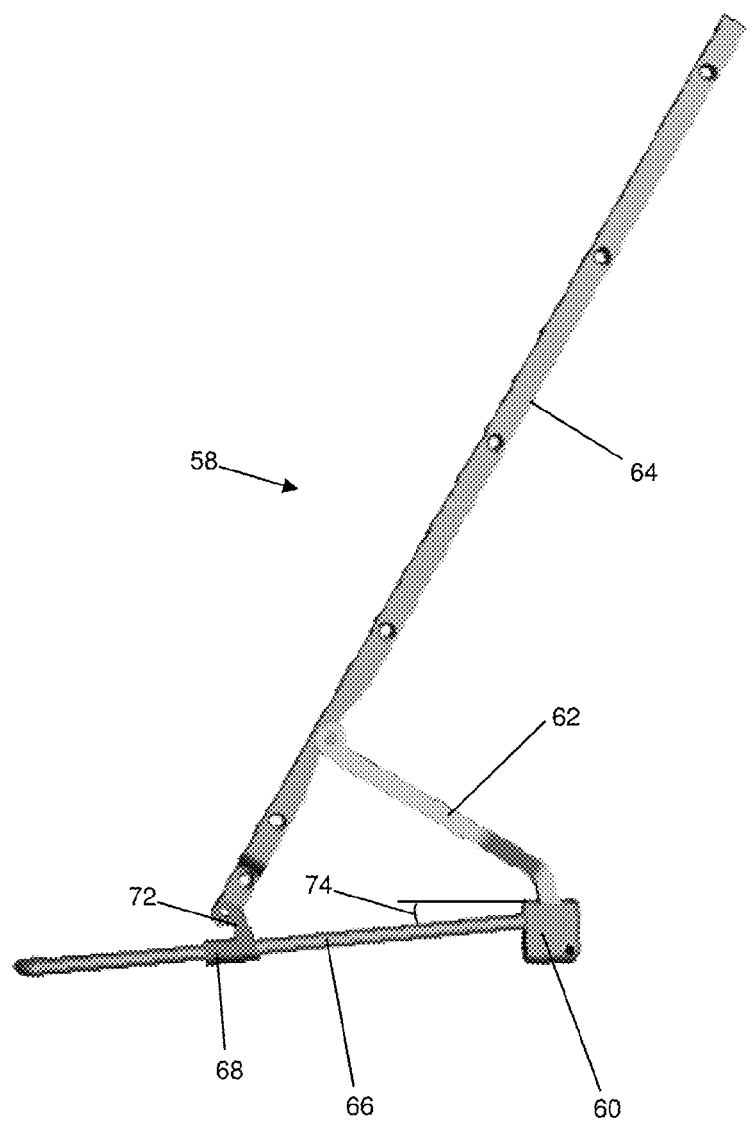
FIG. 7 shows internal components of the hinge structure of FIG. 6.

FIG. 7 shows an example of an internal mechanism 58 that can provide the desired support and guide the desired movement for lid 12 relative to base 14. Mechanism 58 can include a hinge block 60, an arm support 62 rotatably connected with hinge block 60, a side support 64 rotatably connected with arm support 62, a slide rail 66 that extends from hinge block 60, and a slide element 68 that is configured to slide along rail 66 and is rotatably connected to side support 64. Two such mechanisms 58 can be included in computer 10 on opposing sides thereof. Specifically, side supports 64 can be attached along opposing sides of lid 12 such as to sides of a display assembly internal to lid 12 such that side supports 64 can be covered by insert 54. Hinge blocks 60 can be assembled within base 14 near opposing rear corners thereof with arm supports 62 extending through a corresponding openings in upper surface 22. Frame element 48 can be affixed to arm supports 62 by, for example, a snap-fit arrangement, to appropriately position arms 38 and central member 50 relative to frame element 48. Arm supports 62 can be configured, such as by using the shape thereof shown in FIG. 7, to permit frame element 48 to rotate and translate as necessary to clear any adjacent portions of base 14.

Figure 8:
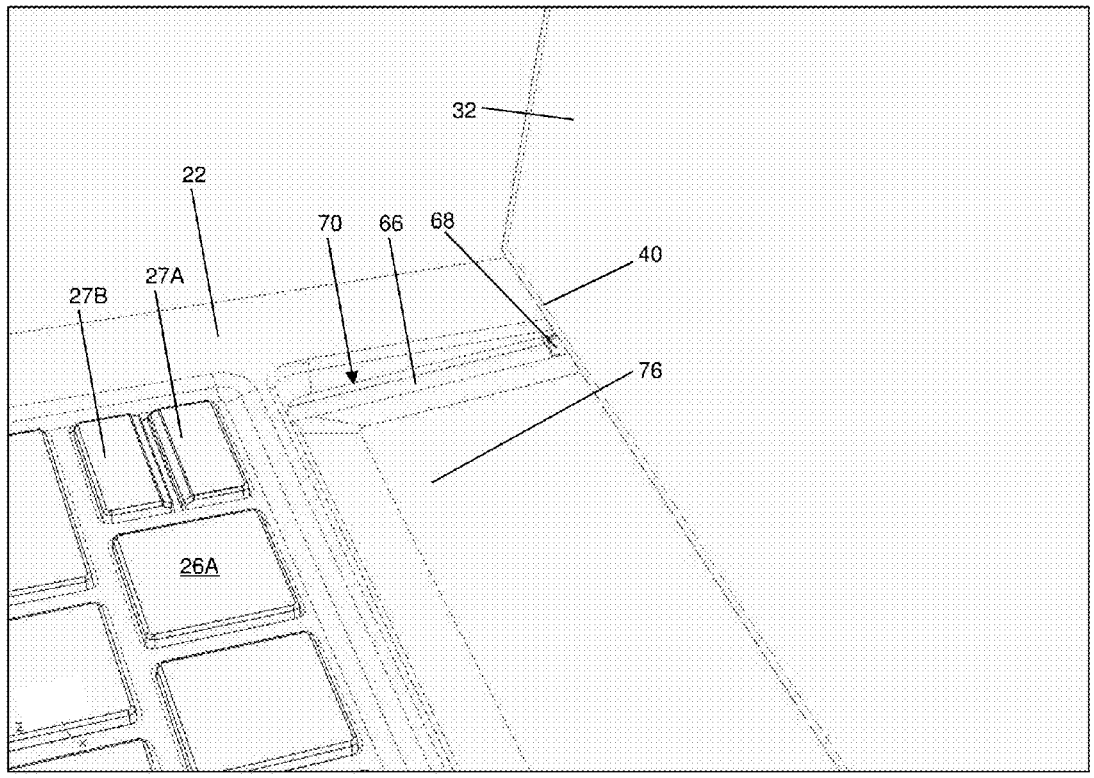
FIG. 8 is a detail view showing a portion of the portable computer of FIG. 1.

Slide rails 66 can be attached within base 14 that can further include slots 70 through surface 22 that overlie and correspond with rails 66. In other examples, similar rails can be positioned on the outside of base 14 and can be, for example, integrally formed with surface 22, thereof. Slots 70 (as shown in FIG. 8) can be configured such that flanges 72 of slide elements 68 can extend therethrough and attach to lid 12 near the bottom edge 40 thereof by attachment to side supports 64. The length of rails 66 and the corresponding slots 70 can be configured to give the desired range of motion for bottom edge 40 of surface 32 relative to base 14, as discussed above. Slide rails 66 and any corresponding slots 70 can be spaced apart from each other at a distance that is at least 80% (+/−5%) of the overall width of base 14. In other examples, rails 66 and corresponding slots 70 can be positioned within 1 inch of the nearest side edge of base 14.

Various joints or connection points between elements in mechanism 58 can be configured to provide a predetermined degree of friction therebetween such that the friction can help maintain a position of lid 12 relative to base 14, including those between the closed and fully open positions, as selected by a user. In an example, the joint between side support 64 and arm support 62 can include a friction element. In another example, slide elements 68 and slide rails 66 can be configured to provide such a friction force. Additionally or alternatively, hinge block 60 and arm support 62 can be configured to provide friction therebetween for a similar purpose.

Rails 66, slots 70 and the area of upper surface 22 between slots 70 can be configured to enhance both the visual appearance and usability of computer 10 when in a fully-opened position (such as shown in FIG. 1). In an example, rails 66 can be angled relative to upper surface 22 at an angle 74 (FIG. 7) that can be, for example, approximately 5 degrees (+/−5%). A corresponding recess 76 (as shown in FIGS. 6 and 8) can be formed in upper surface 22 between slots 70. Such a configuration can allow bottom edge 40 of lid 12 to be positioned substantially flush with upper surface 22 when lid 12 is in a fully opened position by allowing the portion of lid 12 that extends from bottom edge 40 to a direction behind screen 16 to move to a position below bottom edge 40. This portion 55 of lid 12 (FIG. 6), which can be included on insert 54 can be positioned within recess 76 to prevent interference thereof with surface 22. Recess 76 can be sloped to allow for portion 55 of lid 54 to move below surface 22 progressively as lid 12 rotates during opening thereof.

In an embodiment, the area within recess 76 can include a grate or mesh pattern defined by a plurality of small openings through the housing of base 14 arranged in a pattern or an array. The openings can provide areas for air to move between the interior and exterior of base 14. Such air movement can be used as an inlet or outlet for a fan internal to base 14 for cooling and/or can be used as a port for speakers within base 14.

Figure 9:
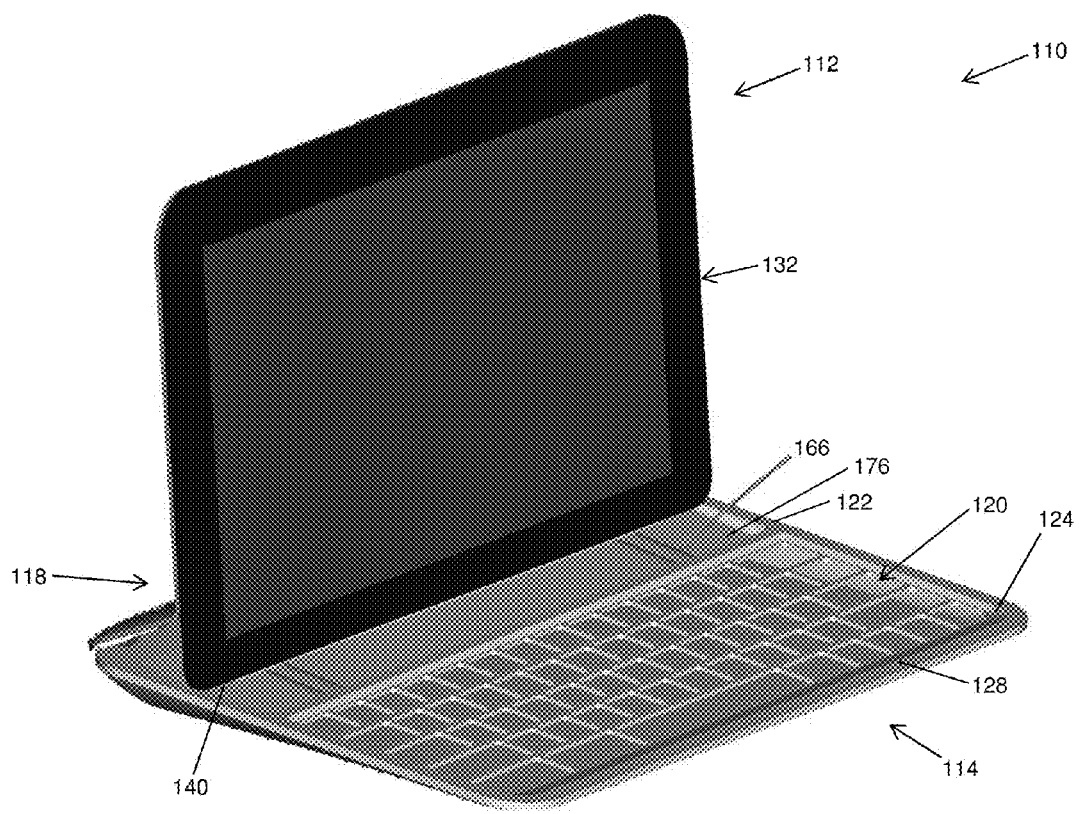
FIG. 9 is an isometric view of a portable computer according to another embodiment of the present disclosure in an partially-open configuration.
Figure 10:
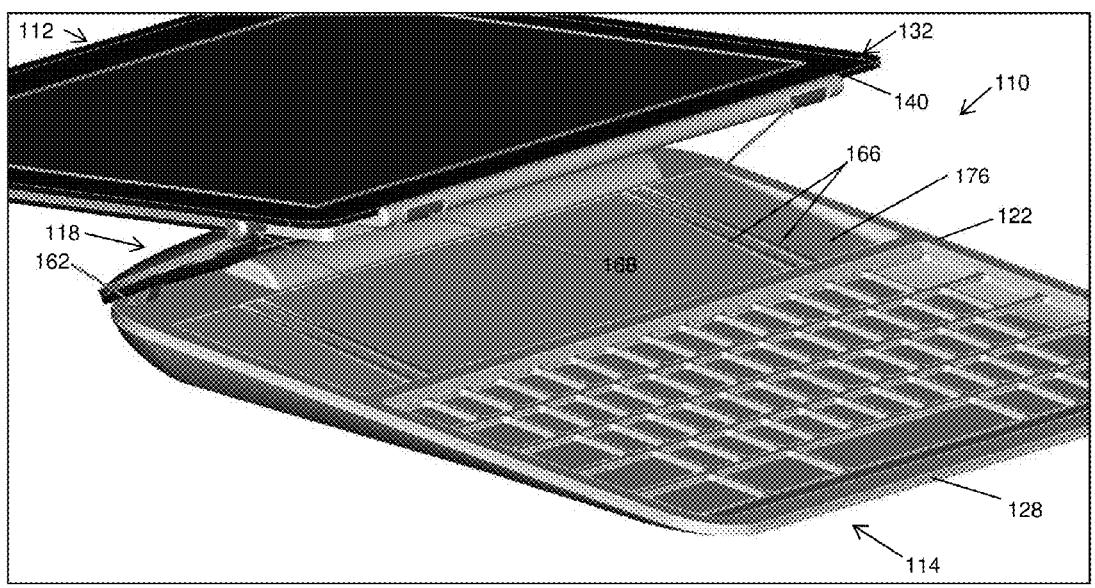
FIG. 10 is a detail view of the portable computer of FIG. 9 showing various components thereof.

An alternative arrangement for hinge structure 118 is shown in FIGS. 9 and 10. In such an arrangement, lid 112 is left unattached from base 114 along bottom edge 140 thereof. In such an arrangement a plurality of bushing elements 168 can be positioned along bottom edge 140 that can allow bottom edge 140 to slide along a portion of base 114, such as rails 166 that extend within recess 176, during movement of bottom edge 140 between back edge 130 and keyboard 120 during opening and closing of lid 112. To maintain bottom edge 140 against base 114 during regular use of computer 110 or regular opening and closing thereof, arms 138 can be spring-biased toward surface 122. Further, the connection between arms 138 and lid 112 can be configured to provide a level of internal friction to counteract the spring biasing to allow lid 112 to maintain a position thereof relative to base 114, as selected by a user. As an alternative a ratchet structure can be employed, such as internally at the connection between arms 138 and lid 112. In another example, bushing members 168 can fit within a stepped track (not shown) that can include ridges on which bushing members 168 can rest in selected positions of lid 112 relative to base 114.

In a further example of computer 110 as shown in FIGS. 9 and 10, bushing elements 168 can include respective magnets embedded therein. In a particular example, bushing elements 168 can include an internal magnet surrounded with a thin portion of a wear-resistant sheet metal. A corresponding magnetically-sympathetic element, which can be of any material that is naturally attracted with the magnets embedded in bushing elements or in which such an attraction can be induced, can be positioned on or inside base 114 in the area which bushing elements 168 are intended to slide. Such magnetically sympathetic element can serve to attract bushing elements 168 to base 114, and to maintain bushing element 168 against base 114 during normal use of computer 110. The magnetically sympathetic elements can themselves be magnets or can be of a ferrous material such as steel or the like. In other examples, bushing elements 168 can be configured to be magnetically sympathetic with magnets positioned within base 114. This magnetic hinge structure can help to maintain an appropriate position for lid 112 relative to base 114 during a desired range of motion thereof, and can further allow for a reduced spring force to be used at the connection between arms 138 and back edge 130 of base 114 compared to a non-magnetic variation. Additionally, the magnets in bushing elements 168 can be configured such that during any mishandling of computer 110, such as dropping thereof or excessive force application to lid 112, the magnets can release from base 114, allowing lid 112 to move away therefrom to prevent damage to the hinge structure 118. Upon returning computer 110 to suitable conditions, the magnets can help hinge structure 118 to return to a normal operating configuration.

In the example described above with respect to FIGS. 1-8, frame element 48 can be affixed to arm supports 62 by a snap or press fit arrangement, as mentioned above. In such an arrangement, the strength of the snap or press-fit arrangement can be configured such that frame element 48 can detach from at least one of the arm supports 62 in the event that a user attempts to move lid 12 to the closed configuration with an object, such as the user's finger, positioned between surface 22 and an arm 38. Such an arrangement can reduce the likelihood of injury to the user from pinching or the like that could occur in such circumstances. It can also reduce the likelihood of damage to the hinge mechanism 18 in such a circumstance.

Figure 11:
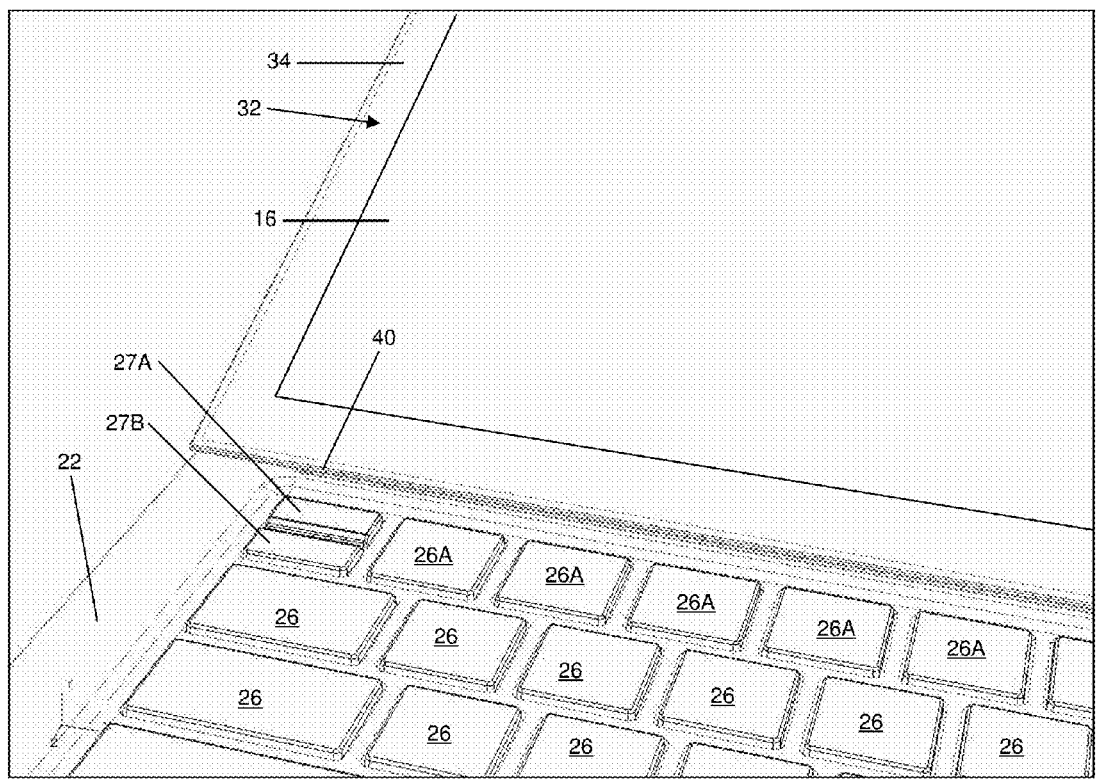
FIG. 11 is a detail view showing various features of the portable computer of FIG. 1.

As mentioned previously, it can be beneficial for a user, when simultaneously or interchangeably interacting with keyboard 20 and a touch-sensitive screen 16, to have screen 16 positioned as close as possible to keyboard 20. It can further be beneficial to have screen 16 positioned as close as possible to the keys 26 on keyboard 20 that incur more frequent use. In some embodiments of keyboards, the layout thereof can include a row of "function" keys (which can be identified by a number following the letter "F", such as F1, F2, etc.). Such keys can carry out functions related to various features of the computer or the operating system thereof such as controlling the volume of a computer's speakers or the brightness of the display. They can further carry out specific operations of a program itself. In many circumstances, however, such keys are less frequently used than the other letter and number keys used in typing on a keyboard. Accordingly, in an example of computer 10, the keyboard 20 can lack a function row of keys, with the numeric keys 26A, being the uppermost row of keys, as shown in FIG. 11. This can allow for bottom edge 40 of surface 32 to be positioned closer to the numeric keys 26A than would be possible if a function key row were present. In an example, the bottom edge 40 of surface 32 is positionable within about 0.5 inches of the numeric keys 26A on a standard alphanumeric QWERTY keyboard. In another example, the bottom edge 40 is positionable within about 0.25 inches of the numeric keys 26A.

In some examples, it may be beneficial to replace the functionality of certain keys in an ordinary keyboard layout with functionality from the removed function row. This can be done to allow a modified keyboard arrangement that does not have a function row to include, for example, one or two keys that include the functionality of more frequently-used function keys in the place of lesser-used type input keys. In an example, in a traditional U.S. English keyboard arrangement, the key immediately above the "tab" key and to the left of the "1" key is used to input an accent mark (') or, upon depressing while the shift key is held down, a tilde mark (~). In certain circumstances and depending on the primary use of a computer, these key inputs may be used less than input keys that are often found in a function row of keys. For example, the escape (esc) key can often be used by computer programs to exit from or step back in menu item sequences or to exit full-screen modes of browsers, media players or the like. For some users and in certain applications, the escape key input can be used far more often than the accent or tilde key inputs. Accordingly, in an example of an alternate keyboard arrangement, the accent/tilde key can be replaced by a key having an escape input.

In a further example, the accent/tilde key can be replaced by two keys that are shaped and configured to occupy the space of the single accent/tilde key, which can be of the same size as the other alphanumeric keys found on a computer keyboard. Accordingly, keys 27A and 27B can each be the width of the other alphanumeric keys on keyboard 20 but can be up to half of the height thereof. One of such keys, for example key 27A, can be configured as an escape key input, while key 27B can implement another function. In an example, key 27B can input a command not typically implemented within the keyboard configuration itself. For example, in some notebook computer configurations, a "power" button that can be used to turn the computer on or to cause the computer to sleep or to turn off can be positioned on the surface of the base that surrounds the keyboard, for example between the keyboard and the display. Such an area may not be available for location of a power button in the present configuration of computer 10 because such an area may be occupied by recess 76 such that lower edge 40 of display surface 16 can be positioned near keyboard 20. Accordingly, key 27A can be configured as a power button to provide such functionality for computer 10.

Figure 12:
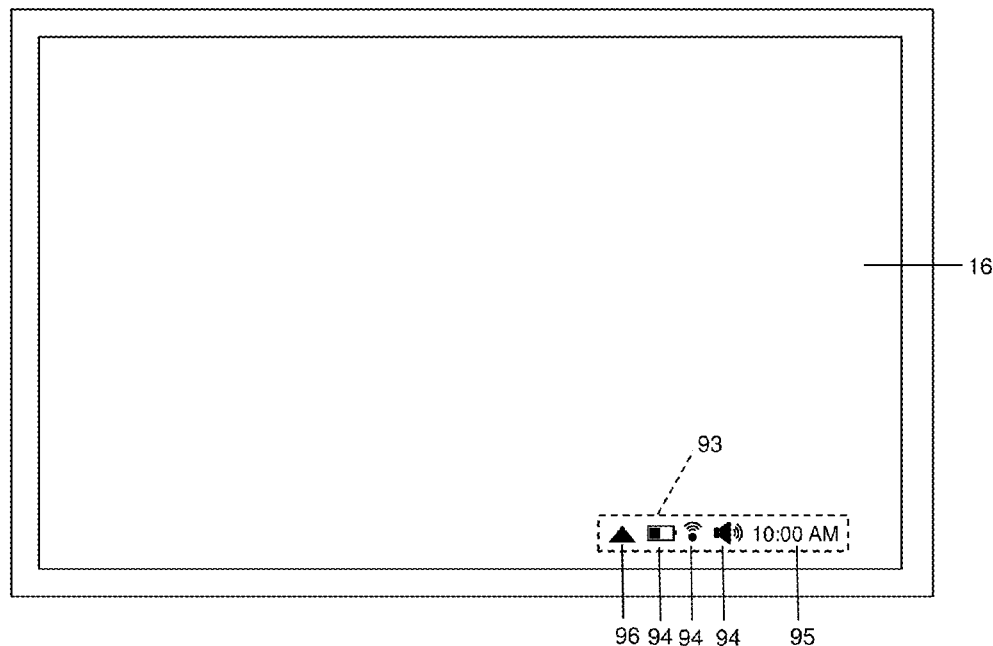
FIGS. 12 and 13 are exemplary views of elements displayable on a computer screen.
Figure 13:
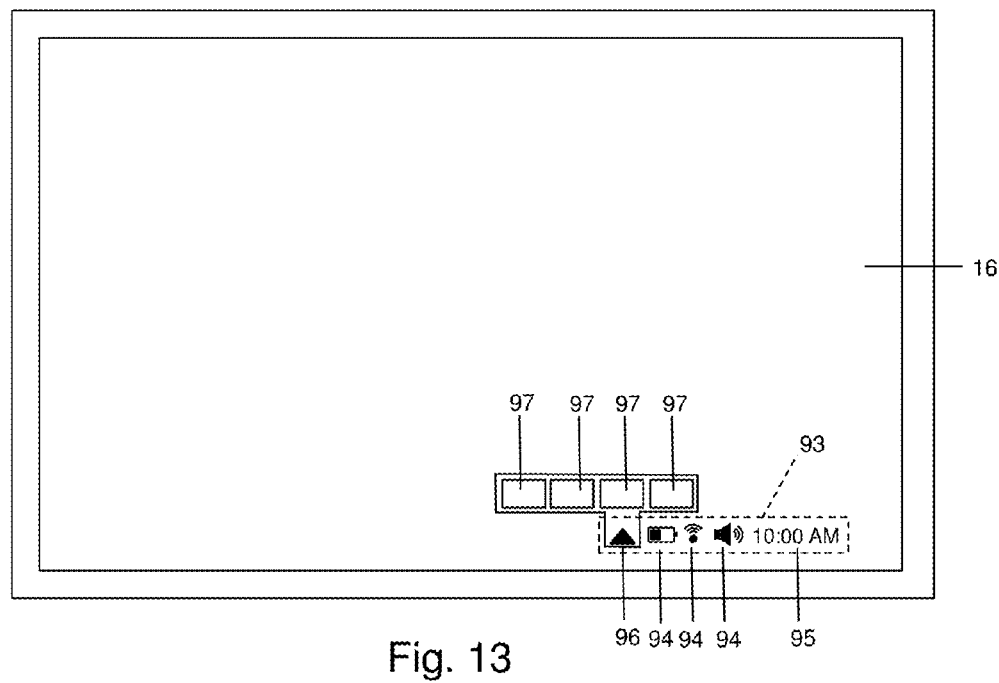

In a further embodiment, the functionality of the removed function keys can be selectively positioned on the screen 16 of computer 10 by the computer's operating system. FIGS. 12 and 13 show exemplary screen views of how such functionality can be implemented. FIG. 12 shows an exemplary view of a layout of a computer screen running an operating system that displays various information related to the computer's operation in what can be referred to as a "system status and notification area" or simply a "notification area" 93. In various examples a system tray 93 can include icons 94 that can be clicked to access menus or other functionality related to the computer's operation. For example, the system tray 93 can include a clock 95 that displays the current time and can be clicked (or tapped in the case of a touchscreen) to access a menu that allows the user, for example, to change the time or set an alarm. System tray 93 of the present example can also include a function icon 96 that can be tapped by the user to cause the computer to display a number of virtual function keys 97, as shown in FIG. 13. It is noted that the representations shown in FIG. 13 are merely exemplary and that other graphical elements in other locations or relative arrangements can be used to implement this functionality. These virtual function keys 97 can be used to control various system functions, such as adjusting the brightness of the computer 10 display 16 or by adjusting the volume of the computer's sound system or other features provided by the operating system of the computer 10. Additionally, such virtual keys 97 can be specially configured and adapted to provide functionality specific to a program running on the computer.

In examples of computer 10 where hinge structure 18 is configured to permit comfortable use thereof with screen 16 disposed at an angle of at least 125 degrees with respect to surface 22, it may be beneficial to provide a screen 16 associated with screen 16 that is viewable through a wide range of angles relative to the viewer's line of sight to the screen. In an example, a screen with a vertical viewing angle of at least 90 degrees from center can be used, and in a further example a screen with a vertical viewing angle of at least about 160 degrees can be used. Such a viewing angle can be achieved by a screen implementing in-plane switching ("IPS") technology. In addition the display associated with screen 16 can be a high-definition display having at least a resolution of 1280×720 pixels, and in some instances up to 1920×1080 pixels or greater. Such an arrangement can, for example, allow a user to clearly view the image presented on screen 16 when screen is positioned at an angle of up to 155 degrees with respect to surface 22 at an ordinary seated position relative to keyboard.

Additionally, the hinge structure 18 described in various examples herein, by enabling sliding of bottom edge 40 toward keyboard 20 in connection with moving lid 12 to the open configuration, can improve the stability of computer 10 during use. In particular, when in the open configuration, the position of the top edge 41 of screen 16 is closer to the rearward point of contact of computer 10 than it would be if lid 12 were hinged at a single point of rotation along back edge 30 of base 14. As illustrated in FIG. 4, the moment arm M1 is illustrated as a line between the uppermost edge 41 of lid 12 and the location of feet 78. In a conventional hinge arrangement, the moment arm would be approximately the entire length of the lid 12 plus the thickness of the base 14 at the point of attachment. As can be seen in FIG. 4, the length of moment arm M1 is reduced compared to such a conventional arrangement. The precise reduction in moment arm length is dependent upon the overall shape of computer 10 and the particular configuration of hinge structure 18. In one example, the moment arm M1 can be reduced compared to a conventional notebook computer arrangement of a notebook with a similarly sized lid and base at least about 20% and in some examples up to about 35% or more.

The reduction in the length of moment arm M1 can provide a stable arrangement when computer 10 is in an open configuration. This can include during adjustment of the specific position of screen 16 relative to surface 22. In an example, hinge structure 18 can be configured to require a force of at least 110 grams, applied at the uppermost portion 41 of lid 12, to cause lid 12 to move against the frictional aspects of hinge structure 18. In such an example, the stability of computer 10 can be such that the base 14 of computer 10 remains in full contact with the surface on which computer 10 is resting. In a further example, hinge structure 18 can provide stability to resist tipping during interaction with screen 16 such as by touching, tapping, swiping or the like with up to a force of at least 300 grams at a location at the uppermost area of touch-sensitivity of screen 16.

Additionally, hinge structure 18 can reduce bouncing or vibration of lid 12 during interaction with screen 16, such as by tapping. This can be achieved by the hinge structure 18 providing a moment arm M2, as shown in FIG. 4, between the uppermost area of screen 16 and the point of attachment with arms 38 that is shorter than the height of screen 16 itself. In conventional clamshell arrangements, the moment arm between the uppermost portion of a screen and the point of attachment to the base of the computer is equal to the height of the screen because the only attachment between the lid and the base is along the lower edge of the lid. In the present arrangement, by providing an additional attachment point 39 above the lowermost edge 40 of lid 12, such a moment arm can be reduced, thereby reducing the force on the point of attachment caused by a force on the screen. Further, by including multiple, vertically-spaced points of attachment between lid 12 and base 14, specifically at arm 38 and at slide element 68 the overall rotational force applied by the hinge structure 18 to counteract a point force on the screen can be increased. These counteracting forces can further minimize the movement of lid 12 caused by tapping on screen 16. Further, by relatively shortening the length of the unsupported portion of lid 12 (which is done by the attachment of arm 38 to lid 12 above the lower edge 40 of screen 16) the amplitude of any vibrations or bouncing incurred by lid 12 is reduced.

Computer 10 can be further structured to include customizable components. In one example insert 54 can be configured to be releasably detachable from the remainder of lid 12. This can allow for insert 54 to be interchangeable among a number of inserts with variations in one or several characteristic including, color, material, texture, finish or the like. Among various configurations for providing an interchangeable insert 54, the selection of a particular insert 54 and assembly thereof can be done either at the point of assembly before sale or by the consumer after purchase of the computer 10, at which point inserts 54 could be made to be readily swappable by the consumer. In such an instance, a number of different inserts 54 could be provided with the computer 10 at a point of sale or customized or replacement inserts 54 could be sold as an aftermarket product. Customized inserts 54 could be provided by a system that allows the user to develop and order their own combination of various features, including those mentioned above, from a list of pre-determined options. Such a system could be Internet-based, allowing the user to make such selections on a specially-configured web page which would also allow the user to place an order for their custom insert. Such a web page could also allow the user to provide an image of their own selection to be printed or otherwise integrated onto insert 54. This can be done by allowing the user to upload an image or by integration of the infrastructure with available image storage and sharing services, for example Google® Picasa® or with social networking websites, for example Google+™.

User replacement of insert 54 can be facilitated by the structure of the attachment of insert 54 with the remainder of lid 12. In an example, insert 54 can be slidably received with lid 12 such as within lid frame 52. Such a sliding relationship can include a snap or press-fit feature toward the end of the range of sliding into the assembled state to help retain insert 54 within lid frame 52. Such a sliding assembly of insert 54 into lid frame 52 can be facilitated by the above-described releasable attachment of frame element 48 onto arm supports 62. In particular, when frame element 48 is in place on arm supports 62, it can be positioned adjacent insert when computer 10 is in the closed position, and can effectively block insert from sliding away from front edge 28 in a direction of removal from lid frame 52. Upon removal of frame element 48 from arm supports 62 with computer in the closed position, insert 54 can then be slid from out of lid frame 52 and removed from lid 12. Another insert 54 can then be assembled into lid frame 52 by sliding thereof into lid frame 52 and frame element 48 can be re-assembled with arm supports 62. When lid 12 is in the open position, an adjacent portion of base 14 can block insert from removal from within lid frame 52.

The shape of computer 10 overall can be configured to be easily carried by a user. In an example shown in FIG. 3, a portion of base disposed toward the back edge 30 thereof and defining the lower surface 23 of base 14 can be shaped to provide a comfortable grip 80 for a user to carry computer 10 in his or her hand. In one aspect the grip 80 can be configured such that computer 10 has a thickness in the area of grip that is of a comfortable thickness for a user to grasp. For example, the thickness T1 of computer 10 in the closed configuration in the area of grip 80 can be between about 25 and about 30 mm (+/−5%). Additionally grip 80 can define a ridge 82 whereby the thickness of the computer 10 in the area of grip abruptly decreases moving in a direction from the back edge 30 toward the front edge 28 of base 14. Ridge 82 can provide an area for the user's fingers to wrap partially around, enhancing the user's ability to hold onto computer 10 at grip 80.

To further the tactile quality of grip provided by the size and shape, including ridge 82, thereof, a pad 84 can be provided on at least a portion of grip 80. In an example pad 84 can be applied to of affixed on grip 80 at least over ridge 82. Pad 84 can be of a rubber, elastomeric, or soft-touch material. In an example, pad 84 can be piece of appropriately-shaped rubber that is affixed on grip 80 by adhesive or the like. Additionally or alternatively such a pad 84 can include one or more snap-fit features to mutually engage with corresponding features of base 14. In another example, pad 84 can be formed as a rubberized or soft-touch coating on base 14 in the desired area of grip 80. In a still further example, pad 84 can be an area of a thermoplastic elastomer ("TPE") co-molded with the material of base 14, which can be for example, a polymeric material such as ABS, polycarbonate, or the like.

Figure 14:
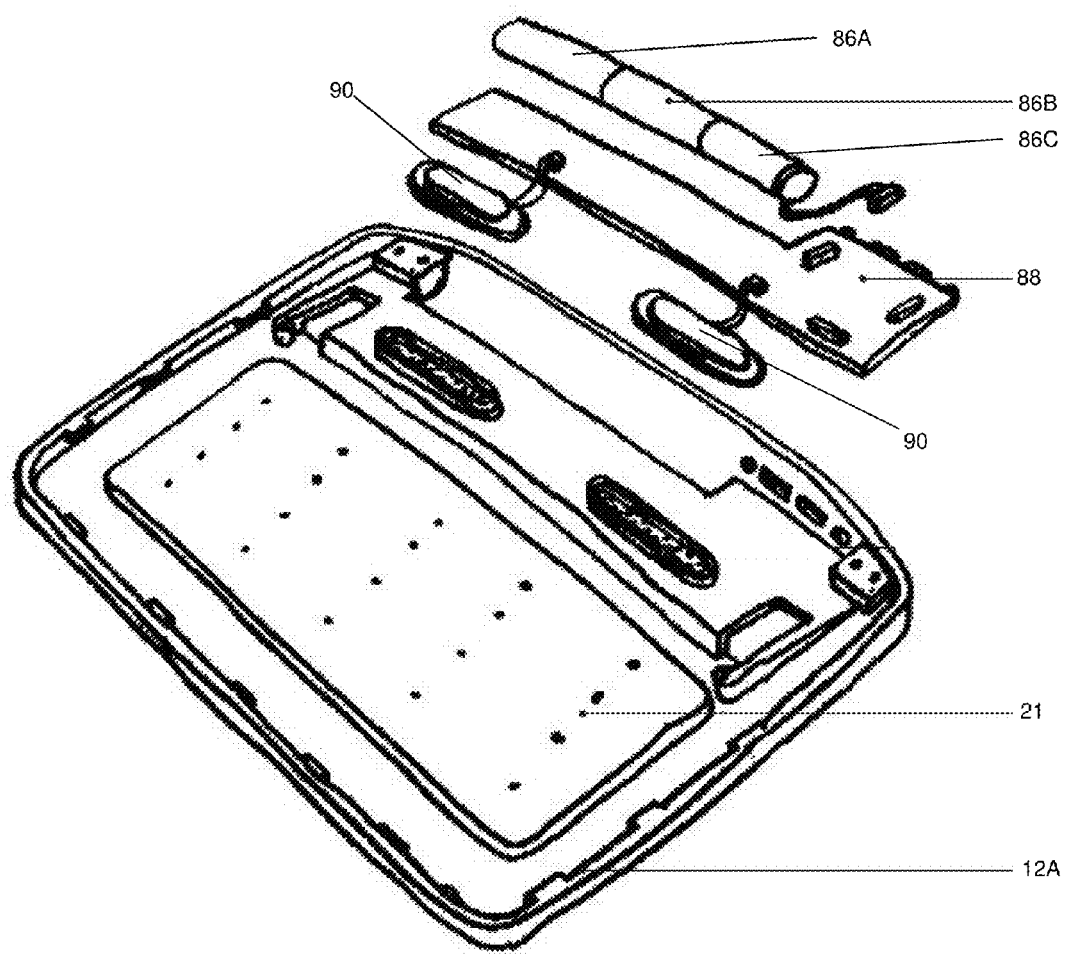
FIG. 14 is an exploded view showing various internal components of the portable computer of FIG. 1.
Figure 15:
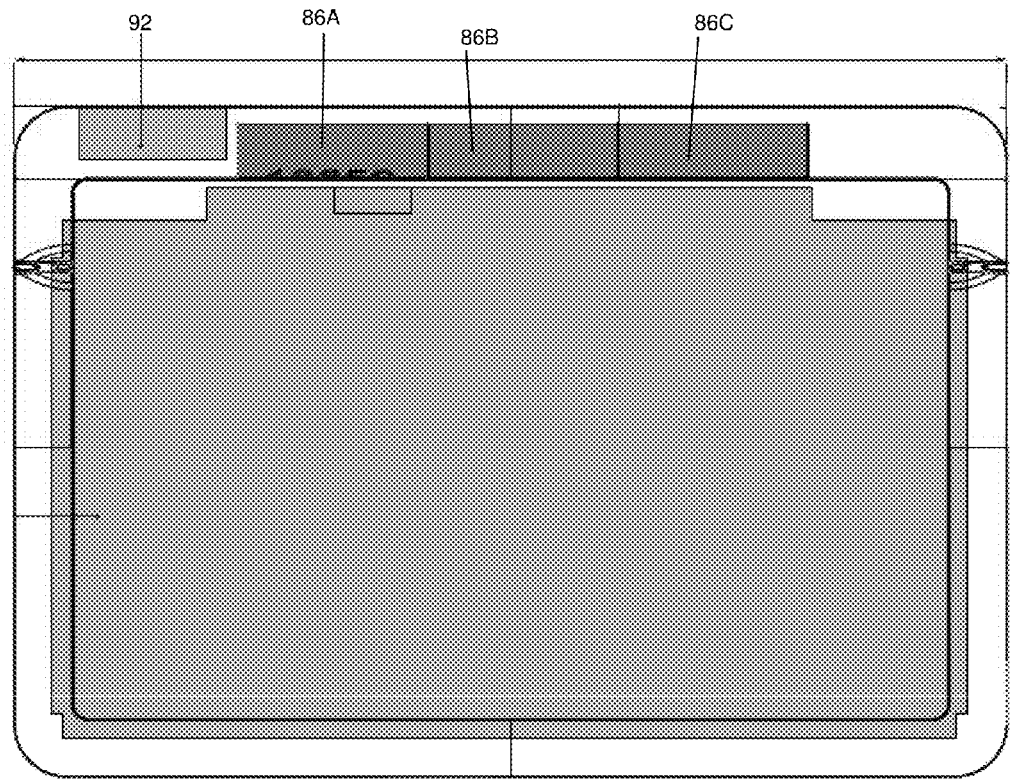
FIGS. 15 and 16 are top and side views, respectively, of the portable computer of FIG. 1 showing exemplary locations for internal components thereof.
Figure 16:
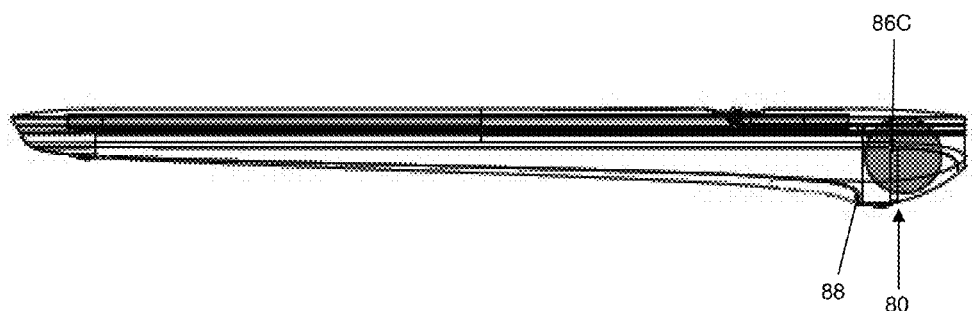

The larger interior area for base 14 provided in the area of grip 80 can be a location for an internal battery 86 or batteries 86 to be held within base 14 to provide portable power for computer 10, such as batteries 86A-C shown in FIGS. 15 and 16. In an example, batteries 86 can include a plurality of commercially-available, lithium-ion type rechargeable batteries such as 18650 Cylindrical Cells. Various configurations of computer 10 can be provided that include the exemplary features and structures included herein. For example, computers 10 that correspond in size to various differently-sized displays 16 can be made having respective bases 12, lids 14, and hinge structures 18 that are sized to generally correspond to the various display sizes. In an example, variations of computer 10 can be made available in sizes corresponding to diagonal display dimensions of 11.6" (computer 10A in FIG. 17), 13.3" (computer 10B), and 15.6" (computer 10C). To facilitate production of such differently-sized computers 10A, 10B, and 10C, for example, and to potentially reduce costs thereof, such computers can share some common components. Various internal components of a computer 10 are shown in FIG. 14 and include, for example batteries 86, a printed circuit board ("PCB") 88, speakers 90, and a connection unit 92 that can include circuitry and associated mechanical structures to connect computer 10 with various peripheral devices. For example, connection unit 92 can include a plug to connect computer 10 with an external power source and can further include, for example one or more USB ports or other similar connection ports. Connection unit 92 can also include audio connections including a headphone outlet or a microphone input. Connection unit 92 can be connected with PCB 88.

Figure 17:
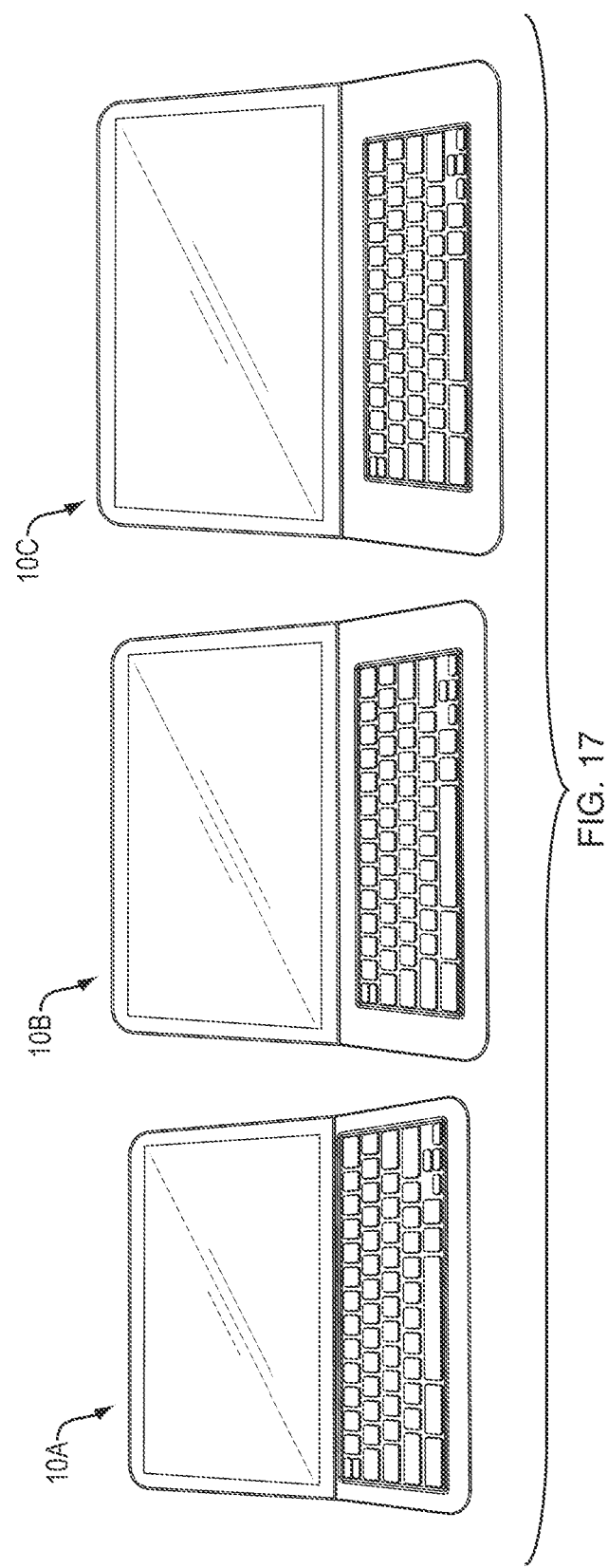
FIG. 17 shows examples of notebook computers in various sizes that can include various features and structures of the present disclosure.

The internal components, including batteries 86, PCB 88, speakers 90, and connection unit 92, along with keyboard 20 and an associated keyboard support 21 can be common among differently-sized configurations of computer 10 such as computers 10A, 10B, and 10C, shown in FIG. 17. In an example, a larger configuration of computer, such as computer 10C can include an additional battery 86 of the same size and configuration of those included in a smaller configuration, such as computer 10A. The components can be assembled within different sizes of lower base housing 12A, as shown in FIG. 14 that are configured to received the common components and the desired number of batteries.

In a further example, keyboard 20 can be in the form of a single touch-based input structure that is configured to be usable as a keyboard. For example, keyboard 20 can be a structure similar to trackpad or other touch based input that is enlarged to a size usable as a keyboard and can include markings to indicate relative positions where touches on the surface are interpreted as particular keystrokes (such as the different alphanumeric keys of a typical keyboard). The touch-based keyboard can further include a three-dimensional shape thereon to simulate individual keys. Further, a keyboard with such a shape can be flexible or otherwise resiliently deformable so that the individual key structures can be depressed during typing in a manner similar to a typical keyboard having different keys. The touch-based keyboard 20 can be configured to use the touch sensitivity thereof to detect various gestures or the like that can be enacted by the user over a plurality of keys. Such gestures can include single or multiple-finger swiping in various directions and/or pinching tapping or the like.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A portable computer, comprising:
    a base assembly including an upper surface defining a front edge and a back edge, the base assembly further including a keyboard disposed on a portion of the upper surface, a portion of the upper surface between the keyboard and the back edge being recessed with respect to portions of the upper surface between the keyboard and the front edge;
    a lid assembly including an inside surface having a display viewable thereon and defining a lower edge, the lid assembly further including a cover surface opposite the inside surface and an edge surface extending between the inside surface and the cover surface; and
    a hinge structure configured to attach the lid assembly to the base assembly such that the lid is moveable with respect to the base between a closed position wherein the inside surface is parallel to and adjacent the upper surface and a fully open position wherein the screen surface is disposed at an angle of between 130 degrees and 160 degrees with respect to the upper surface, such that portions of the cover surface and the edge surfaces are received within the recessed portion of the upper surface, and such that the lower edge of the display is positioned adjacent the upper surface between the recessed portion and the keyboard.

2. The computer of claim 1, wherein when the lid is in the fully open position, the lower edge of the inside surface is positioned within about 0.5 inches of the keyboard.

3. The computer of claim 1, wherein when the lid is in the fully open position, the lower edge of the inside surface is positioned within about 0.25 inches of the keyboard.

4. The computer of claim 3, wherein when the lid is in the fully open position the lower edge of the inside surface is positioned within about 0.5 inches of a row of keys positioned on the keyboard nearest to the back edge of the base assembly.

5. The computer of claim 4, wherein the keyboard includes a plurality of alphanumeric keys distributed in an array having four rows, each of the alphanumeric keys being of a uniform width and height with respect to the array, and wherein the keyboard further includes a first button and a second button, the first and second buttons being configured as computer keys and together occupying a space equal in width and height to that of any one of the alphanumeric keys, the first and second buttons being located on the keyboard adjacent to at least one of the alphanumeric keys and being positioned in a corresponding one of the four rows, the first and second buttons being configured to provide distinct inputs to the computer.

6. The computer of claim 1, wherein the recessed portion varies in depth from a lesser depth at a location disposed toward the back edge of the base assembly to a greater depth at a location disposed toward the keyboard.

7. The computer of claim 1, wherein the hinge structure includes:
    first and second arms rotatably affixed to the base assembly adjacent opposite sides of the back edge and to the lid assembly at respective locations spaced apart from the lower edge of the inside surface;
    first and second rails affixed with the base assembly at laterally spaced locations so as to extend from adjacent the back edge in a direction toward the front edge; and
    first and second slide elements slidably connected to the first and second rails and rotatably connected with the lid assembly at respective locations adjacent the lower edge thereof.

8. The computer of claim 7, wherein the hinge structure is configured such that rotation of the lid assembly with respect to the base assembly also causes constrained linear movement of the lower edge of the inside surface in a direction between the keyboard and the back edge.

9. The computer of claim 8, wherein the constrained linear movement of the lower edge of the display is through a distance of at least 30% of the depth of the base assembly.

10. The computer of claim 7, wherein the rails are disposed within the recessed portion.

11. The computer of claim 7, wherein the base includes a pair of slots extending through the upper surface thereof within the recessed portion, wherein the first and second rails are affixed within the base assembly, and wherein the slide elements are configured to respectively extend through ones of the pair of slots.

12. The computer of claim 7, wherein the first and second arms of the hinge assembly are spring biased toward the base, and wherein the slide elements are configured to provide friction with the first and second rails to resist the spring bias of the arms to maintain the lid in a user-selectable position in which the display is positioned at an angle between 15% and 160% with respect to the upper surface of the base assembly.

13. The computer of claim 1, wherein the hinge structure is configured such that the lid assembly is moveable into a fully-open position with the display at an angle of at least about 130° with respect to the upper surface of the base assembly and such that the upper edge of the lid is positioned behind the back edge at a distance of less than 60% of the depth of the base assembly.

14. A portable computer, comprising:
  a base assembly including an upper surface defining a front edge and a back edge, the base assembly further including a keyboard disposed on a portion of the upper surface and including an array of alphanumeric keys in an array having a plurality of rows of keys, wherein a portion of the upper surface of the base assembly between the keyboard and the back edge is recessed with respect to portions between the keyboard and the front edge;
  a lid assembly including a screen surface having a display viewable thereon and defining a lower edge, a cover surface opposite the screen surface, and an edge surface extending between the screen surface and the cover surface; and
  a hinge structure configured to affix the lid assembly to the base assembly such that the lid is moveable with respect to the base between a closed position wherein the screen surface is parallel to and adjacent the upper surface and a fully open position wherein the screen surface is disposed at an angle of between 130 degrees and 160 degrees with respect to the upper surface and the lower edge of the screen surface overlies the upper surface of the base assembly in a position within about 0.5 inches of a top row of keys;
  wherein the hinge structure further includes a frame element and arms integrally formed therewith, the arms including angled faces configured to provide a stop for opening the lid relative to the base.

15. The computer of claim 14, wherein the hinge structure is configured such that when the lid assembly is in the fully open position the lower edge of the screen surface is positioned adjacent the upper surface.

16. The computer of claim 15, wherein the hinge structure is configured such that when the lid assembly is in the fully open position the lower edge of the screen surface is positioned within 0.1 inches of the upper surface.

17. The computer of claim 14, wherein portions of the cover surface and the edge surface are received within the recessed portion of the upper surface when the lid assembly is in the fully open position.

18. The computer of claim 17, wherein progressively greater portions of the cover surface and the edge surface are received within the recessed portion through a portion of the movement of the lid assembly from the closed position to the fully open position.

19. The computer of claim 17, wherein the recessed portion varies in depth from a lesser depth at a location disposed toward the back edge of the base assembly to a greater depth at a location disposed toward the keyboard.

\* \* \* \* \*